US012689059B2

(12) United States Patent
Hashimoto et al.

(10) Patent No.: US 12,689,059 B2
(45) Date of Patent: Jul. 21, 2026

(54) ION-CONDUCTIVE SOLID AND ALL-SOLID-STATE BATTERY

(71) Applicant: CANON OPTRON, INC., Ibaraki (JP)

(72) Inventors: Saori Hashimoto, Tochigi (JP); Yoshitaka Shiba, Tochigi (JP); Noriko Sakamoto, Tochigi (JP); Takeshi Kobayashi, Ibaraki (JP); Toyoki Okumura, Osaka (JP); Hironori Kobayashi, Osaka (JP); Tomonari Takeuchi, Osaka (JP)

(73) Assignee: CANON OPTRON, INC., Ibaraki (JP)

( * ) Notice: Subject to any disclaimer, the term of this patent is extended or adjusted under 35 U.S.C. 154(b) by 503 days.

(21) Appl. No.: 18/460,974

(22) Filed: Sep. 5, 2023

(65) Prior Publication Data

US 2023/0411684 A1      Dec. 21, 2023

Related U.S. Application Data

(63) Continuation of application No. PCT/JP2021/045283, filed on Dec. 9, 2021.

(30) Foreign Application Priority Data

May 31, 2021      (JP) ................................. 2021-090888

(51) Int. Cl.
*H01M 10/0562*      (2010.01)
(52) U.S. Cl.
CPC .................. *H01M 10/0562* (2013.01); *H01M 2300/0077* (2013.01)
(58) Field of Classification Search
None
See application file for complete search history.

(56) References Cited

U.S. PATENT DOCUMENTS

| | | | |
|---|---|---|---|
| 9,786,907 B2 | 10/2017 | Sugiura | |
| 11,404,718 B2 | 8/2022 | Sakai et al. | |
| 2022/0302497 A1 | 9/2022 | Shiba et al. | |

FOREIGN PATENT DOCUMENTS

| | | |
|---|---|---|
| CN | 105304891 A | 2/2016 |
| CN | 111295719 A | 6/2020 |
| JP | 2017-91953 A | 5/2017 |
| JP | 2017-91955 A | 5/2017 |
| WO | 2022/254753 A1 | 12/2022 |
| WO | 2022/254754 A1 | 12/2022 |
| WO | 2022/254755 A1 | 12/2022 |
| WO | 2022/254756 A1 | 12/2022 |
| WO | 2022/254757 A1 | 12/2022 |

OTHER PUBLICATIONS

Shiba et al., U.S. Appl. No. 18/460,986, filed Sep. 5, 2023.
Kobayashi et al., U.S. Appl. No. 18/242,209, filed Sep. 5, 2023.
Shiba et al., U.S. Appl. No. 18/242,204, filed Sep. 5, 2023.
Hashimoto et al., U.S. Appl. No. 18/460,956, filed Sep. 5, 2023.
International Search Report in International Application No. PCT/JP2021/045283 (Feb. 2022).
Toyoki Okumura et al., "All-Solid-State Lithium-Ion Battery Using Li2.2C0.8B0.2O3 Electrolyte," 288 Solid State Ionics 248-252 (2016).
Toyoki Okumura et al., "Zr- and Ce-Doped Li6Y(BO3)3 Electrolyte for All-Solid-State Lithium-Ion Battery," 11 RSC Adv. 1653016536 (2021).

*Primary Examiner* — Colin W. Slifka

(74) *Attorney, Agent, or Firm* — VENABLE LLP

(57)      ABSTRACT

Provided are: an ion-conductive solid which can be produced by heat treatment at a low temperature and which has high ion conductivity; and, an all-solid-state battery having the ion-conductive solid. An ion-conductive solid containing an oxide represented by the general formula $Li_{6-3a-2b-c-d}Yi_{1-c-d}Al_aMg_bZr_cCe_dB_3O_9$; and, an all-solid-state battery having at least a positive electrode, a negative electrode, and an electrolyte, at least one element selected from the group consisting of the positive electrode, the negative electrode, and the electrolyte containing the ion-conductive solid (In the formula, a is such that $0.000 \leq a \leq 0.800$, b is such that $0.000 \leq b \leq 0.800$, c is such that $0.000 \leq c \leq 0.400$, d is such that $0.000 \leq d \leq 0.400$, and a and b are real numbers satisfying $0.005 \leq a+b \leq 0.800$.).

9 Claims, No Drawings

ION-CONDUCTIVE SOLID AND ALL-SOLID-STATE BATTERY

CROSS REFERENCE TO RELATED APPLICATIONS

This application is a Continuation of PCT International Application No. PCT/JP2021/045283, filed on Dec. 9, 2021, which is claiming priority of Japanese Patent Application No. 2021-090888, filed on May 31, 2021, all of which are hereby expressly incorporated by reference into the present application.

BACKGROUND OF THE INVENTION

Field of the Invention

The present disclosure relates to an ion-conductive solid and to an all-solid-state battery.

Description of the Related Art

Lightweight and high-capacity lithium ion secondary batteries have come to be mounted in mobile devices such as smartphones and notebook computers, and in transport equipment such as electric vehicles and hybrid electric vehicles.

However, conventional lithium ion secondary batteries utilize electrolytes in the form of liquids that contain flammable solvents, which accordingly entails the risk of leakage of the flammable solvent and the risk of fire at the time of a battery short circuit. For the purpose of ensuring safety, therefore, secondary batteries that utilize electrolytes in the form of ion-conductive solids, different from liquid electrolytes, have attracted attention in recent years; such secondary batteries are referred to as all-solid-state batteries.

Solid electrolytes such as oxide-based solid electrolytes and sulfide-based solid electrolytes are widely known as electrolytes used in all-solid-state batteries. Among the foregoing, oxide-based solid electrolytes do not generate hydrogen sulfide by reacting with atmospheric moisture, and hence are safer than sulfide-based solid electrolytes.

An all-solid-state battery has a positive electrode containing a positive electrode active material, a negative electrode containing a negative electrode active material, an electrolyte containing an ion-conductive solid, and disposed between the positive electrode and the negative electrode, and, as needed, a collector (the positive electrode active material and the negative electrode active material are hereafter also referred collectively to as "electrode active material"). In a case where an all-solid-state battery is produced using an oxide-based solid electrolyte, a heat treatment is performed for the purpose of reducing contact resistance between particles of the oxide-based material contained in the solid electrolyte. However, conventional oxide-based solid electrolytes require a high temperature, of 900° C. or above, in a heat treatment, and hence the solid electrolyte and the electrode active material may react and form thereby a high-resistance phase. This high-resistance phase may give rise to decreased ionic conductivity of the ion-conductive solid, which in turn may result in a drop of output of the all-solid-state battery.

Examples of oxide-based solid electrolytes that can be produced as a result of a heat treatment at a temperature lower than 900° C. include $Li_{2+x}C_{1-x}B_xO_3$ (Solid State Ionic 288 (2016) 248-252).

SUMMARY OF THE INVENTION

The present disclosure provides an ion-conductive solid that can be produced as a result of a heat treatment at low temperature, and that exhibits high ionic conductivity, and provides an all-solid-state battery having that ion-conductive solid.

An ion-conductive solid of the present disclosure is an ion-conductive solid comprising an oxide represented by Formula $Li_{6-3a-2b-c-d}Y_{1-c-d}Al_aMg_bZr_cCe_dB_3O_9$, wherein in the formula, a, b, c and d are real numbers satisfying $0.000 \leq a \leq 0.800$, $0.000 \leq b \leq 0.800$, $0.000 \leq c \leq 0.400$, $0.000 \leq d \leq 0.400$, and $0.005 \leq a+b \leq 0.800$.

Further, an all-solid-state battery of the present disclosure is an all-solid-state battery, comprising at least:
a positive electrode;
a negative electrode; and
an electrolyte,
wherein at least one selected from the group consisting of the positive electrode, the negative electrode and the electrolyte comprises the ion-conductive solid of the present disclosure.

One aspect of the present disclosure allows providing an ion-conductive solid that can be produced as a result of a heat treatment at low temperature, and that exhibits high ionic conductivity, and an all-solid-state battery having that ion-conductive solid. Further features of the present disclosure will become apparent from the following description of exemplary embodiments.

DESCRIPTION OF THE EMBODIMENTS

In the present disclosure the notations "from XX to YY" and "XX to YY" representing a numerical value range signify, unless otherwise specified, a numerical value range that includes the lower limit and the upper limit of the range, as endpoints.

In a case where numerical value ranges are described in stages, the upper limits and the lower limits of the respective numerical value ranges can be combined arbitrarily.

In the present disclosure, the term "solid" refers to a state of matter exhibiting a constant shape and volume, from among the three states of matter; the term "solid" encompasses also a powder state.

The ion-conductive solid of the present disclosure is an ion-conductive solid comprising an oxide represented by Formula $Li_{6-3a-2b-c-d}Y_{1-c-d}Al_aMg_bZr_cCe_dB_3O_9$.

In the formula, a, b, c and d are real numbers satisfying $0.000 \leq a \leq 0.800$, $0.000 \leq b \leq 0.800$, $0.000 \leq c \leq 0.400$, $0.000 \leq d \leq 0.400$ and $0.005 \leq a+b \leq 0.800$.

The inventors surmise the following concerning the underlying reason for the improved ionic conductivity of an ion-conductive solid containing the oxide represented by the above formula.

When within the scope of the present disclosure part of Li which is a monovalent metal element is replaced by at least one selected from the group consisting of Al which is a trivalent metal element and Mg which is a divalent metal element, the balance of charge becomes adjusted on account of substitution by elements having dissimilar valences, and as a result a state of deficient $Li^+$ is brought about in the crystal lattice. The ensuing migration of surrounding $Li^+$ so as to fill up this $Li^+$ deficiency results in improved conductivity.

Preferably, the ion-conductive solid of the present disclosure has a monoclinic crystal structure. When the ion-conductive solid has a monoclinic crystal structure, then in a case where part of Li⁺ is replaced, within the scope of the present disclosure by at least one element selected from the group consisting of Al and Mg, which are metal elements having a higher valence than Li⁺, the lattice constant is affected to a greater degree, and lattice volume and ionic conductivity are further affected thereby, than is the case for $Li_{6-c-d}Y_{1-c-d}Zr_cCe_dB_3O_9$ (i.e. where a=b=0.000, 0.000≤c≤0.400, and d is 0.000≤d≤0.400) and for $Li_6YB_3O_9$ (i.e. where a=b=c=d=0.000) that do not contain Al or Mg.

In an X-ray diffraction analysis (hereafter also simply referred to as "XRD") using CuKα rays, a diffraction peak appearing in the vicinity of 2θ=28° can vary depending on the composition of the above-described ion-conductive solid.

The ion-conductive solid of the present disclosure preferably exhibits a diffraction peak in the range 27.90°≤2θ≤28.10°, more preferably a diffraction peak in the range 27.95°≤2θ≤28.05°, and yet more preferably a diffraction peak in the range 27.97° 20 28.03°, in XRD using CuKα rays.

The position of the diffraction peak appearing in the vicinity of 2θ=28° in XRD using CuKα rays can be controlled by adjusting the values of a, b, c and d in the above formula.

A lattice volume V of the ion-conductive solid of the present disclosure is preferably 753.00 Å³≤V≤756.00 Å³, more preferably 753.00 Å³≤V≤755.50 Å³, and yet more preferably 753.00 Å³≤V≤755.10 Å³.

The lattice volume of the ion-conductive solid can be controlled through adjustment of the values of a, b, c and d in the above formula.

In the above formula, a is a real number satisfying 0.000≤a≤0.800.

The lower limit of a can be for instance 0.000 or larger, or larger than 0.000, 0.005 or larger, or 0.010 or larger, or 0.020 or larger, or 0.050 or larger, or 0.100 or larger. The upper limit of a can be for instance 0.800 or smaller, or 0.400 or smaller, or 0.200 or smaller, or 0.100 or smaller, or 0.050 or smaller or 0.030 or smaller. The above numerical value ranges can be combined arbitrarily, for instance to 0.000≤a≤0.800 or 0.000≤a≤0.400.

In the above formula, b is a real number satisfying 0.000≤b≤0.800.

The lower limit of b can be for instance 0.000 or larger, or 0.005 or larger, or 0.010 or larger. The upper limit of b can be for instance 0.800 or smaller, or 0.400 or smaller, or 0.100 or smaller, or 0.050 or smaller, or 0.030 or smaller. The above numerical value ranges can be combined arbitrarily, for instance to 0.000≤b≤0.400.

In the above formula, c is a real number satisfying 0.000≤c≤0.400.

The lower limit of c can be for instance 0.000 or larger, or 0.010 or larger, or 0.030 or larger. The upper limit of c can be for instance 0.400 or smaller, or 0.200 or smaller, or 0.100 or smaller. The above numerical value ranges can be combined arbitrarily, for instance to 0.000≤c≤0.200.

In the above formula, d is a real number satisfying 0.000≤d≤0.400.

The lower limit of d can be for instance 0.000 or larger, or 0.010 or larger. The upper limit of d can be for instance 0.400 or smaller, or 0.200 or smaller, or 0.100 or smaller, or 0.030 or smaller. The above numerical value range can be combined arbitrarily, but is for instance 0.000≤d≤0.200.

In the above formula, a and b are real numbers satisfying 0.005≤a+b≤0.800.

The lower limit of a+b can be for instance 0.005 or larger, or 0.010 or larger. The upper limit of a+b can be for instance 0.800 or smaller, or 0.400 or smaller, or 0.200 or smaller. The above numerical value ranges can be combined arbitrarily, for instance to 0.010≤a+b≤0.800 or 0.010≤a+b≤0.400.

The ion-conductive solid of the present disclosure can be embodied for instance as follows, but is not limited to embodiments below.

(1)
It suffices that a satisfies 0.010≤a≤0.100, b satisfies 0.010≤b≤0.100, c satisfies 0.000≤c≤0.200, d satisfies 0.000≤d≤0.200, and a and b satisfy 0.020≤a+b≤0.200.

(2)
It suffices that a satisfies 0.010≤a≤0.050, b satisfies 0.010≤b≤0.050, c satisfies 0.030≤c≤0.100, d satisfies 0.010≤d≤0.030, and a and b satisfy 0.020≤a+b≤0.100.

(3)
It suffices that that a satisfies 0.010≤a≤0.100, b satisfies 0.010≤b≤0.100, c satisfies 0.000≤c≤0.200, d satisfies 0.000≤d≤0.200, and a and b satisfy 0.020≤a+b≤0.200.

(4)
It suffices that a satisfies 0.000≤a≤0.050, b satisfies 0.000≤b≤0.050, c satisfies 0.050≤c≤0.150, d satisfies 0.010≤d≤0.030, and a and b satisfy 0.010≤a+b≤0.030.

A method for producing the ion-conductive solid of the present disclosure will be explained next.

The method for producing an ion-conductive solid of the present disclosure can be implemented in the manner below, but is not limited thereto.

A method for producing an ion-conductive solid comprising an oxide represented by Formula $Li_{6-3a-2b-c-d}Y_{1-c-d}Al_aMg_bZr_cCe_dB_3O_9$ may have a primary baking step of heat-treating a starting material, resulting from mixing so that the oxide represented by the above formula is obtained, at a temperature below the melting point of the oxide.

In the formula, a, b, c and d are real numbers satisfying 0.000≤a≤0.800, 0.000≤b≤0.800, 0.000≤c≤0.400, 0.000≤d≤0.400, and 0.005≤a+b≤0.800.

The method for producing an ion-conductive solid of the present disclosure can include a primary baking step of weighing and mixing starting materials so that the oxide represented by the above formula is obtained, and heat-treating the starting materials at a temperature below the melting point of the oxide, to produce as a result an ion-conductive solid containing the above oxide. The production method may include a secondary baking step of heat-treating the obtained ion-conductive solid containing the oxide at a temperature below the melting point of the oxide, to produce a sintered compact of the ion-conductive solid containing the above oxide.

The method for producing an ion-conductive solid of the present disclosure including the above primary baking step and secondary baking step will be explained in detail below, but the present disclosure is not limited to the below-described production method.

Primary Baking Step

In the baking step, starting materials such as chemical reagent-grade $Li_3BO_3$, $H_3BO_3$, $Y_2O_3$, $ZrO_2$, $CeO_2$, $Al_2O_3$ and/or MgO are stoichiometrically weighed and mixed so that Formula $Li_{6-3a-2b-c-d}Y_{1-c-d}Al_aMg_bZr_cCe_dB_3O_9$ is achieved (where a, b, c and d are real numbers satisfying 0.000≤a≤0.800, 0.000≤b≤0.800, 0.000≤c≤0.400, 0.000≤d≤0.400, and 0.005≤a+b≤0.800).

The apparatus used for mixing is not particularly limited, and for instance a pulverizing mixer such as a planetary ball mill can be used. The material and capacity of a container used for mixing, and the material and diameter of balls, are not particularly limited, and can be selected as appropriate depending on the types and amounts of the starting materials that are used. As an example, a 45 mL container made of zirconia, and 5 mm-diameter balls made of zirconia can be used herein. The conditions for the mixing treatment are not particularly limited, but may involve setting for instance revolutions from 50 rpm to 2000 rpm and a duration from 10 minutes to 60 minutes.

Once a mixed powder of the above starting materials has been obtained as a result of the mixing treatment, the obtained mixed powder is thereafter press-molded into pellets. The pressure molding method that is resorted to can be a known pressure molding method such as cold uniaxial molding or cold isostatic pressure molding. The pressure molding conditions in the primary baking step are not particularly limited, but for instance may involve a pressure set to from 100 MPa to 200 MPa.

The obtained pellets are baked using a baking apparatus such as an atmospheric baking apparatus. The temperature at which solid-phase synthesis is elicited through primary baking is not particularly limited, so long as it is lower than the melting point of the ion-conductive solid represented by Formula $Li_{6-3a-2b-c-d}Y_{1-c-d}Al_aMg_bZr_cCe_dB_3O_9$. The temperature at the time of the primary baking can be for instance lower than 700° C., or 680° C. or lower, or 670° C. or lower, or 660° C. or lower, or 650° C. or lower, and can be for instance 500° C. or higher. The above numerical value ranges can be combined arbitrarily. Solid-phase synthesis can be sufficiently elicited if the temperature lies within the above ranges. The duration of the primary baking step is not particularly limited, but can be for instance from about 700 minutes to 750 minutes.

Through the above primary baking step there can be produced the ion-conductive solid comprising an oxide represented by Formula $Li_{6-3a-2b-c-d}Y_{1-c-d}Al_aMg_bZr_cCe_dB_3O_9$. A powder of the ion-conductive solid comprising the above oxide can also be obtained through pulverization of the ion-conductive solid comprising the above oxide, using a mortar/pestle or a planetary mill.

Secondary Baking Step

In the secondary baking step, at least one selected from the group consisting of the ion-conductive solid comprising an oxide obtained in the primary baking step and a powder of the ion-conductive solid comprising an oxide is pressure-molded and is baked, to yield a sintered compact of the ion-conductive solid comprising an oxide of the present disclosure.

Pressure molding and secondary baking may be performed simultaneously for instance by spark plasma sintering (hereafter also simply referred to as "SPS") or hot pressing; alternatively, pellets may be produced by cold uniaxial molding, and may be thereafter baked for instance in the ambient atmosphere, an oxidizing atmosphere or a reducing atmosphere. Under the above conditions an ion-conductive solid of high ionic conductivity can be obtained that does not result in melting on account of a heat treatment. The pressure molding conditions in the secondary baking step are not particularly limited, but for instance may involve a pressure from 10 MPa to 100 MPa.

The secondary baking temperature is lower than the melting point of the ion-conductive solid represented by Formula $Li_{6-3a-2b-c-d}Y_{1-c-d}Al_aMg_bZr_cCe_dB_3O_9$. The secondary baking temperature is preferably lower than 700° C., more preferably 680° C. or lower, yet more preferably 670° C. or lower, and particularly preferably 660° C. or lower.

The lower limit of the temperature is not particularly restricted, and may be for instance 500° C. or higher, although the lower the limit, the better the limit is. The above numerical value ranges can be combined arbitrarily, and for instance the temperature at the time of secondary baking may be set to lie in the range from 500° C. to less than 700° C. Within the above ranges it becomes possible to suppress melting or decomposition of the ion-conductive solid containing an oxide of the present disclosure in the secondary baking step, and to obtain a sintered compact of the ion-conductive solid containing an oxide of the present disclosure having been sufficiently sintered.

The duration of the secondary baking step can be modified as appropriate for instance in accordance with the secondary baking temperature, but is preferably 24 hours or shorter, and may be set to 1 hour or shorter. The duration of the secondary baking step may be for instance 5 minutes or longer.

The method for cooling the sintered compact of the ion-conductive solid containing an oxide of the present disclosure obtained as a result of the secondary baking step is not particularly limited, and may involve natural cooling (in-furnace cooling), or rapid cooling; alternatively, cooling more gradual than natural cooling, or a certain temperature may be held during cooling.

An all-solid-state battery of the present disclosure will be explained next.

An all-solid-state battery ordinarily has a positive electrode, a negative electrode, an electrolyte containing an ion-conductive solid, disposed between the positive electrode and the negative electrode, and, as needed, a collector.

The all-solid-state battery of the present disclosure is
an all-solid-state battery comprising at least
a positive electrode;
a negative electrode; and
an electrolyte;
wherein at least one selected from the group consisting of the positive electrode, the negative electrode and the electrolyte comprises the ion-conductive solid of the present disclosure.

The all-solid-state battery of the present disclosure may be a bulk-type battery or a thin-film battery. The concrete shape of the all-solid-state battery of the present disclosure is not particularly limited, and examples thereof include a coin shape, a button shape, a sheet shape and a multilayer shape.

The all-solid-state battery of the present disclosure comprises an electrolyte. In the all-solid-state battery of the present disclosure, preferably, at least the electrolyte comprises the ion-conductive solid of the present disclosure.

The solid electrolyte in the all-solid-state battery of the present disclosure may be made up of the ion-conductive solid of the present disclosure, may comprise another ion-conductive solid, and may comprise an ionic liquid and/or a gel polymer. The other ion-conductive solid is not particularly limited, and may include an ion-conductive solid ordinarily used in all-solid-state batteries, for instance LiI, $Li_3PO_4$ or $Li_7La_3Zr_2O_{12}$. The content of the ion-conductive solid of the present disclosure in the electrolyte in the all-solid-state battery of the present disclosure is not particularly limited, and is preferably 25 mass % or higher, more preferably 50 mass % or higher, yet more preferably 75 mass % or higher, and is particularly preferably 100 mass %.

The all-solid-state battery of the present disclosure comprises a positive electrode. The positive electrode may include a positive electrode active material, and may include the positive electrode active material and the ion-conductive solid of the present disclosure. A known positive electrode active material such as a sulfide containing a transition metal element or an oxide containing lithium and a transition metal element may be used, without particular limitations, as the positive electrode active material.

The positive electrode may further contain a binder, a conductive agent and the like. Examples of the binder include for instance polyvinylidene fluoride, polytetrafluoroethylene and polyvinyl alcohol. Examples of the conductive agent include for instance natural graphite, artificial graphite, acetylene black and ethylene black.

The all-solid-state battery of the present disclosure comprises a negative electrode. The negative electrode may include a negative electrode active material, and may include the above negative electrode active material and the ion-conductive solid of the present disclosure. Known negative electrode active materials, for instance inorganic compounds such as lithium, lithium alloys or tin compounds, carbonaceous materials capable of absorbing and releasing lithium ions, and conductive polymers can be used, without particular limitations, as the negative electrode active material.

The negative electrode may further contain a binder, a conductive agent and the like. Binders and conductive agents similar to those exemplified for the positive electrode may be used herein as the binder and the conductive agent.

The wording to the effect that the electrode "includes" an electrode active material signifies that the electrode has an electrode active material as a component/element/property. For instance, the wording "includes" applies both to an instance where the electrode contains the electrode active material in the interior, and to an instance where the surface of the electrode is coated with the electrode active material.

The positive electrode and the negative electrode can be obtained in accordance with known methods that involve for instance mixing of starting materials, molding, and a heat treatment. As a result, the ion-conductive solid gets for instance into gaps between electrode active material particles, which is deemed to make it easier to secure conduction paths for lithium ions. The ion-conductive solid of the present disclosure can be produced through a heat treatment at a lower temperature than in conventional art, which is deemed to allow suppressing as a result formation of a high-resistance phase derived from reactions between the ion-conductive solid and the electrode active material.

The positive electrode and the negative electrode may have a collector. As the collector there can be used a known collector, for instance of aluminum, titanium, stainless steel, nickel, iron, baked carbon, a conductive polymer or conductive glass. For the purpose of enhancing the adhesion, conductivity, oxidation resistance and the like, a collector can be used that has been treated for instance with carbon, nickel, titanium or silver.

The all-solid-state battery of the present disclosure can be obtained in accordance with a known method that involves for instance laying up of a positive electrode, a solid electrolyte and a negative electrode, and performing molding and a heat treatment. Given that the ion-conductive solid of the present disclosure can be produced in accordance with a heat treatment at a lower temperature than in conventional instances, it is considered that formation of a high-resistance phase derived from reactions between the ion-conductive solid and the electrode active material can be accordingly suppressed; it is thus deemed that an all-solid-state battery can be obtained that boasts excellent output characteristics.

An explanation follows next on measurement methods of compositions and of various physical properties according to the present disclosure.

Methods for Identifying and Analyzing Al, Mg, Zr and Ce

A composition analysis of the ion-conductive solid is performed by wavelength-dispersive X-ray fluorescence analysis (hereafter also referred to as XRF) using a sample solidified by pressure molding. In a case where the analysis is difficult for instance due to a granularity effect, the ion-conductive solid may be made into glass, in accordance with a glass bead method, the glass being then subjected to a composition analysis by XRF. The composition analysis may be performed by inductively coupled high-frequency plasma atomic emission spectrometry (ICP-AES) in a case where yttrium peaks and peaks of Al, Mg, Zr and Ce overlap in XRF.

The analyzer ZSX Primus II by Rigaku Corporation is used as in the case of XRF. The analysis conditions include using Rh in the anode of the X-ray tube, a vacuum atmosphere, an analysis diameter of 10 mm, an analysis range from 17 deg to 81 deg, a step of 0.01 deg, and a scan speed of 5 sec/step. Detection is accomplished using a proportional counter in measurements of light elements, and a scintillation counter in measurements of heavy elements.

Elements are identified on the basis of peak positions in the spectrum obtained by XRF, and molar concentration ratios Y/Al, Y/Mg, Y/Zr and Y/Ce are calculated from count rates (units: cps) which are numbers of X-ray photons per unit time, to work out a, b, c and d.

Measurement of X-ray Diffraction Peaks and Calculation of Lattice Volumes

Herein D8 ADVANCE by Bruker AXS Inc. is used for X-ray diffraction analysis of the ion-conductive solid.

A powder obtained through pulverization of the ion-conductive solid with mortar and pestle is set in a holder, and is then pressed from above using a flat glass plate, to spread the powder evenly and yield an analysis sample that is then subjected to X-ray diffraction analysis (XRD) using a CuKα ray source.

The temperature is set to room temperature (25° C.), the analysis range to 10 deg to 70 deg, step to 0.007, and scan speed to 0.1 step/second.

In a diffraction curve obtained by XRD, $2\theta$ of a peak top occurring at $2\theta=28.00\pm0.200$ deg, derived from $Li_6YB_3O_9$, is worked out as the peak position.

The lattice volume of the crystal phase is calculated using the diffraction curve obtained by XRD and using the structural analysis software TOPAS by Bruker AXS Inc. The lattice volume is calculated through fitting and analysis, by TOPAS, of the diffraction curve obtained by XRD and the diffraction pattern of the monoclinic crystal phase.

EXAMPLES

Illustrative instances in which the ion-conductive solid of the present disclosure was specifically produced and evaluated will be explained next as examples. The present disclosure is however not limited to the examples below.

Example 1

Primary Baking Step

Herein $Li_3BO_3$ (by Toshima Manufacturing Co., Ltd., purity 99.9 mass %), $H_3BO_3$ (by Kanto Chemical Co., purity 99.5%), $Y_2O_3$ (by Shin-Etsu Chemical Co., Ltd., purity 99.9 mass %) and $Al_2O_3$ (by Baikowski SA, purity 99.9%), used as starting materials, were weighed stoichiometrically so as to yield $Li_{5.970}Y_{1.000}Al_{0.010}B_3O_9$, and were mixed for 30 minutes in a planetary mill P-7, by Fritsch GmbH, at a disc rotational speed of 300 rpm. Zirconia φ5 mm balls and a 45 mL container were used in the planetary mill.

After mixing, the resulting mixed powder was subjected to cold uniaxial molding at 147 MPa using a 100 kN electric press P3052-10, by NPa System Co., Ltd., and was baked in the ambient atmosphere. The heating temperature was set to 650° C. over a holding time of 720 minutes.

The obtained ion-conductive solid containing an oxide was pulverized using a planetary mill P-7 by Fritsch GmbH for 180 minutes at a disk rotation speed of 230 rpm, to prepare a powder of the ion-conductive solid containing an oxide.

Secondary Baking Step

The obtained powder of the ion-conductive solid containing an oxide was molded and subjected to secondary baking, to produce a sintered compact of the ion-conductive solid containing an oxide of Example 1. Secondary baking was carried out in an ambient atmosphere at a heating temperature of 650° C. and over a holding time of 720 minutes.

Examples 2 to 6

Sintered compacts of ion-conductive solids containing an oxide of Examples 2 to 6 were produced in accordance with the same process as in Example 1, but weighing stoichiometrically the above starting materials so that a took on herein the values given in Table 1.

Example 7

A sintered compact of the ion-conductive solid containing an oxide of Example 7 was produced in accordance with the same process as in Example 1, but using $Li_3BO_3$ (by Toshima Manufacturing Co., Ltd., purity 99.9 mass %), $H_3BO_3$ (by Kanto Chemical Co., purity 99.5%), $Y_2O_3$ (by Shin-Etsu Chemical Co., Ltd., purity 99.9 mass %) and MgO (by Ube Material Industries, Ltd., purity 99.0%) as starting materials that were weighed stoichiometrically so as to yield herein $Li_{5.980}Y_{1.000}Mg_{0.010}B_3O_9$.

Examples 8 to 12

Sintered compacts of ion-conductive solids containing an oxide of Examples 8 to 12 were produced in accordance with the same process as in Example 7, but weighing stoichiometrically the above starting materials so that b took on herein the values given in Table 1.

Example 13

A sintered compact of the ion-conductive solid containing an oxide of Example 13 was produced in accordance with the same process as in Example 1, but using $Li_3BO_3$ (by Toshima Manufacturing Co., Ltd., purity 99.9 mass %), $H_3BO_3$ (by Kanto Chemical Co., purity 99.5%), $Y_2O_3$ (by Shin-Etsu Chemical Co., Ltd., purity 99.9 mass %), $Al_2O_3$ (by Baikowski SA, purity 99.9%) and $ZrO_2$ (by Nippon Denko Co., Ltd., purity 99.9%) as starting materials that were weighed stoichiometrically so as to yield herein $Li_{5.725}Y_{0.800}Al_{0.025}Zr_{0.200}B_3O_9$.

Example 14

A sintered compact of the ion-conductive solid containing an oxide of Example 14 was produced in accordance with the same process as in Example 13, but weighing stoichiometrically the above starting materials so that a and c took on herein the values given in Table 1.

Example 15

A sintered compact of the ion-conductive solid containing an oxide of Example 15 was produced in accordance with the same process as in Example 1, but using $Li_3BO_3$ (by Toshima Manufacturing Co., Ltd., purity 99.9 mass %), $H_3BO_3$ (by Kanto Chemical Co., purity 99.5%), $Y_2O_3$ (by Shin-Etsu Chemical Co., Ltd., purity 99.9 mass %), $Al_2O_3$ (by Baikowski SA, purity 99.9%) and $CeO_2$ (by Shin-Etsu Chemical Co., Ltd., purity 99.9%) as starting materials that were weighed stoichiometrically so as to yield herein $Li_{5.725}Y_{0.800}Al_{0.025}Ce_{0.200}B_3O_9$.

Example 16

A sintered compact of the ion-conductive solid containing an oxide of Example 16 was produced in accordance with the same process as in Example 15, but weighing stoichiometrically the above starting materials so that a and d took on herein the values given in Table 1.

Example 17

A sintered compact of the ion-conductive solid containing an oxide of Example 17 was produced in accordance with the same process as in Example 1, but using $Li_3BO_3$ (by Toshima Manufacturing Co., Ltd., purity 99.9 mass %), $H_3BO_3$ (by Kanto Chemical Co., purity 99.5%), $Y_2O_3$ (by Shin-Etsu Chemical Co., Ltd., purity 99.9 mass %), MgO (by Ube Material Industries, Ltd., purity 99.0%) and $ZrO_2$ (by Nippon Denko Co., Ltd., purity 99.9%) as starting materials that were weighed stoichiometrically so as to yield herein $Li_{5.750}Y_{0.800}Mg_{0.025}Zr_{0.200}B_3O_9$.

Example 18

A sintered compact of the ion-conductive solid containing an oxide of Example 18 was produced in accordance with the same process as in Example 17, but weighing stoichiometrically the above starting materials so that b and c took on herein the values given in Table 1.

Example 19

A sintered compact of the ion-conductive solid containing an oxide of Example 19 was produced in accordance with the same process as in Example 1, but using $Li_3BO_3$ (by Toshima Manufacturing Co., Ltd., purity 99.9 mass %), $H_3BO_3$ (by Kanto Chemical Co., purity 99.5%), $Y_2O_3$ (by Shin-Etsu Chemical Co., Ltd., purity 99.9 mass %), MgO (by Ube Material Industries, Ltd., purity 99.0%) and $CeO_2$ (by Shin-Etsu Chemical Co., Ltd., purity 99.9%) as starting materials that were weighed stoichiometrically so as to yield herein $Li_{5.750}Y_{0.800}Mg_{0.025}Ce_{0.200}B_3O_9$.

Example 20

A sintered compact of the ion-conductive solid containing an oxide of Example 20 was produced in accordance with the same process as in Example 19, but weighing stoichiometrically the above starting materials so that b and d took on herein the values given in Table 1.

Example 21

A sintered compact of the ion-conductive solid containing an oxide of Example 21 was produced in accordance with the same process as in Example 1, but using $Li_3BO_3$ (by Toshima Manufacturing Co., Ltd., purity 99.9 mass %), $H_3BO_3$ (by Kanto Chemical Co., purity 99.5%), $Y_2O_3$ (by Shin-Etsu Chemical Co., Ltd., purity 99.9 mass %), $Al_2O_3$ (by Baikowski SA, purity 99.9%), $ZrO_2$ (by Nippon Denko Co., Ltd., purity 99.9%) and $CeO_2$ (by Shin-Etsu Chemical Co., Ltd., purity 99.9%) as starting materials that were weighed stoichiometrically so as to yield herein $Li_{50.800}Y_{0.875}Al_{0.025}Zr_{0.100}Ce_{0.025}B_3O_9$.

Examples 22 to 24

Sintered compacts of ion-conductive solids containing an oxide of Examples 22 to 24 were produced in accordance with the same process as in Example 21, but weighing stoichiometrically the above starting materials so that a, c and d took on herein the values given in Table 1.

Example 25

A sintered compact of the ion-conductive solid containing an oxide of Example 25 was produced in accordance with the same process as in Example 1, but using $Li_3BO_3$ (by Toshima Manufacturing Co., Ltd., purity 99.9 mass %), $H_3BO_3$ (by Kanto Chemical Co., purity 99.5%), $Y_2O_3$ (by Shin-Etsu Chemical Co., Ltd., purity 99.9 mass %), MgO (by Ube Material Industries, Ltd., purity 99.0%), $ZrO_2$ (by Nippon Denko Co., Ltd., purity 99.9%) and $CeO_2$ (by Shin-Etsu Chemical Co., Ltd., purity 99.9%) as starting materials that were weighed stoichiometrically so as to yield herein $Li_{5.825}Y_{0.875}Mg_{0.025}Zr_{0.100}Ce_{0.025}B_3O_9$.

Examples 26 to 28

Sintered compacts of ion-conductive solids containing an oxide of Examples 26 to 28 were produced in accordance with the same process as in Example 25, but weighing stoichiometrically the above starting materials so that b, c and d took on herein the values given in Table 1.

Example 29

A sintered compact of the ion-conductive solid containing an oxide of Example 29 was produced in accordance with the same process as in Example 1, but using $Li_3BO_3$ (by Toshima Manufacturing Co., Ltd., purity 99.9 mass %), $H_3BO_3$ (by Kanto Chemical Co., purity 99.5%), $Y_2O_3$ (by Shin-Etsu Chemical Co., Ltd., purity 99.9 mass %), $Al_2O_3$ (by Baikowski SA, purity 99.9%), and MgO (by Ube Material Industries, Ltd., purity 99.0%) as starting materials that were weighed stoichiometrically so as to yield herein $Li_{5.500}Y_{1.000}Al_{0.100}Mg_{0.100}B_3O_9$.

Comparative Example 1

Primary Baking Step

An ion-conductive solid and a powder of the ion-conductive solid were produced in accordance with the same process as in Example 1, but using $Li_3BO_3$ (by Toshima Manufacturing Co., Ltd., purity 99.9 mass %), $H_3BO_3$ (by Kanto Chemical Co., purity 99.5%) and $Y_2O_3$ (by Shin-Etsu Chemical Co., Ltd., purity 99.9 mass %) as starting materials that were weighed stoichiometrically so as to yield herein $Li_6YB_3O_9$.

Secondary Baking Step

A sintered compact of the ion-conductive solid containing an oxide of Comparative example 1 was produced through molding of a powder of the obtained ion-conductive solid by spark plasma sintering (SPS), with secondary baking. The heating temperature was set to 700° C., the pressure to 30 MPa, and the holding time to 10 minutes.

Comparative Example 2

Primary Baking Step

A solid and a powder of the solid were produced in accordance with the same process as in Example 1, but using $Li_3BO_3$ (by Toshima Manufacturing Co., Ltd., purity 99.9 mass %), $H_3BO_3$ (by Kanto Chemical Co., purity 99.5%), $ZrO_2$ (by Nippon Denko Co., Ltd., purity 99.9%) and $CeO_2$ (by Shin-Etsu Chemical Co., Ltd., purity 99.9%) as starting materials that were weighed stoichiometrically so as to yield herein $Li_{5.000}Zr_{0.800}Ce_{0.200}B_3O_9$.

Secondary Baking Step

The powder of the solid obtained above was molded and subjected to secondary baking, to thereby produce the oxide-containing sintered compact of Comparative example 2. Secondary baking was carried out in an ambient atmosphere at a heating temperature of 550° C. and over a holding time of 720 minutes.

The sintered compacts of the ion-conductive solids containing an oxide of Examples 1 to 29 were subjected to a composition analysis in accordance with the above method. The X-ray diffraction peaks of the sintered compacts of the ion-conductive solids containing an oxide of Examples 1 to 29 were measured, and the respective lattice volumes were calculated. The ionic conductivity of the sintered compacts of Examples 1 to 29 and Comparative examples 1 and 2 was measured in accordance with the following method.

A method for measuring ionic conductivity is described below. Table 1 and Table 2 set out the obtained evaluation results.

Measurement of Ionic Conductivity

Two large-area surfaces parallelly facing each other of each flat plate-shaped sintered compact of each ion-conductive solid containing an oxide obtained through secondary baking were polished using sandpaper. The dimensions of the flat-shaped sintered compact of the ion-conductive solid containing an oxide can be set to 0.9 cm×0.9 cm×0.05 cm, but are not limited thereto. Polishing involved initial polishing with #500 for 15 minutes to 30 minutes, subsequently with #1000 for 10 minutes to 20 minutes, and lastly with #2000 for 5 minutes to 10 minutes; polishing was deemed to be complete once there was no visible unevenness or scratches on the polished surface.

After polishing, a gold film was formed on the polished surface of each sintered compact of an ion-conductive solid containing an oxide using a sputtering apparatus SC-701 MKII ADVANCE by Sanyu Electron Co., Ltd. The film formation conditions included Ar as a process gas, a degree of vacuum from 2 Pa to 5 Pa and a film formation time set to 5 minutes. After film formation, each measurement sample was subjected to an AC impedance measurement.

An impedance/gain phase analyzer SI1260 and a dielectric interface system 1296 (both by Solartron Analytical Inc.) were used for measuring impedance; the measurement conditions included a temperature of 27° C., an amplitude of 20 mV, and a frequency from 0.1 Hz to 1 MHz.

The resistance of each sintered compact of the ion-conductive solid containing an oxide was calculated using a Nyquist plot obtained through impedance measurement, and using the AC analysis software ZView by Scribner Associates Inc. An equivalent circuit corresponding to each measurement sample was set in ZView, whereupon the equivalent circuit and the Nyquist plot were fitted and analyzed, to calculate the resistance of the sintered compact of the ion-conductive solid containing an oxide. Ionic conductivity was then calculated on the basis of the expression below using the calculated resistance, the thickness of the sintered compact of the ion-conductive solid containing an oxide and the electrode area.

> Ionic conductivity (S/cm)=thickness (cm) of sintered compact of ion-conductive solid containing an oxide/(resistance (Ω) of sintered compact of ion-conductive solid containing an oxide×electrode area (cm²))

Results

Table 1 summarizes the stoichiometric amounts of starting materials (values of a, b, c and d in Formula $Li_{6-3a-2b-c-d}Y_{1-c-d}Al_aMg_bZr_cCe_dB_3O_9$) in the production of the sintered compacts of the ion-conductive solids containing an oxide, and ionic conductivity, in Examples 1 to 29 and Comparative examples 1 and 2. Table 2 summarizes the diffraction peak positions and lattice volumes of the sintered compacts obtained in Examples 1 to 29.

The results of the above composition analyses revealed that all the sintered compacts of ion-conductive solids containing an oxide of Examples 1 to 29 and Comparative example 1 had compositions according to the stoichiometric amounts of starting materials given in Table 1. The sintered compacts of ion-conductive solids containing an oxide of Examples 1 to 29 were ion-conductive solids exhibiting high ionic conductivity even when having been baked at a temperature lower than 700° C. By contrast, the main crystalline structure of the sintered compact of Comparative example 2 was that of a mixture of $ZrO_2$ and $CeO_2$ used as starting materials.

TABLE 1

| | $Li_{6-3a-2b-c-d}Y_{1-c-d}Al_aMg_bZr_cCe_dB_3O_9$ | | | | | Ionic conductivity |
|---|---|---|---|---|---|---|
| | a | b | c | d | a + b | (S/cm) |
| Comparative example 1 | 0.000 | 0.000 | 0.000 | 0.000 | 0.000 | 5.61 × 10⁻¹¹ |
| Comparative example 2 | 0.000 | 0.000 | 0.800 | 0.200 | 0.000 | *1 |
| Example 1 | 0.010 | 0.000 | 0.000 | 0.000 | 0.010 | 1.80 × 10⁻⁷ |
| Example 2 | 0.025 | 0.000 | 0.000 | 0.000 | 0.025 | 3.43 × 10⁻⁷ |
| Example 3 | 0.100 | 0.000 | 0.000 | 0.000 | 0.100 | 1.26 × 10⁻⁷ |
| Example 4 | 0.200 | 0.000 | 0.000 | 0.000 | 0.200 | 7.87 × 10⁻⁸ |
| Example 5 | 0.400 | 0.000 | 0.000 | 0.000 | 0.400 | 2.01 × 10⁻⁸ |
| Example 6 | 0.800 | 0.000 | 0.000 | 0.000 | 0.800 | 1.63 × 10⁻⁹ |
| Example 7 | 0.000 | 0.010 | 0.000 | 0.000 | 0.010 | 1.16 × 10⁻⁸ |
| Example 8 | 0.000 | 0.025 | 0.000 | 0.000 | 0.025 | 3.44 × 10⁻⁸ |
| Example 9 | 0.000 | 0.100 | 0.000 | 0.000 | 0.100 | 1.67 × 10⁻⁸ |
| Example 10 | 0.000 | 0.200 | 0.000 | 0.000 | 0.200 | 8.22 × 10⁻⁹ |
| Example 11 | 0.000 | 0.400 | 0.000 | 0.000 | 0.400 | 5.16 × 10⁻⁹ |
| Example 12 | 0.000 | 0.800 | 0.000 | 0.000 | 0.800 | 3.97 × 10⁻⁹ |
| Example 13 | 0.025 | 0.000 | 0.200 | 0.000 | 0.025 | 9.33 × 10⁻⁶ |
| Example 14 | 0.025 | 0.000 | 0.400 | 0.000 | 0.025 | 9.17 × 10⁻⁷ |
| Example 15 | 0.025 | 0.000 | 0.000 | 0.200 | 0.025 | 2.26 × 10⁻⁶ |
| Example 16 | 0.025 | 0.000 | 0.000 | 0.400 | 0.025 | 1.08 × 10⁻⁷ |
| Example 17 | 0.000 | 0.025 | 0.200 | 0.000 | 0.025 | 7.15 × 10⁻⁷ |
| Example 18 | 0.000 | 0.025 | 0.400 | 0.000 | 0.025 | 9.67 × 10⁻⁸ |
| Example 19 | 0.000 | 0.025 | 0.000 | 0.200 | 0.025 | 2.65 × 10⁻⁷ |
| Example 20 | 0.000 | 0.025 | 0.000 | 0.400 | 0.025 | 1.74 × 10⁻⁸ |
| Example 21 | 0.025 | 0.000 | 0.100 | 0.025 | 0.025 | 1.16 × 10⁻⁵ |
| Example 22 | 0.050 | 0.000 | 0.100 | 0.025 | 0.050 | 1.10 × 10⁻⁶ |

TABLE 1-continued

| | $Li_{6-3a-2b-c-d}Y_{1-c-d}Al_aMg_bZr_cCe_dB_3O_9$ | | | | | Ionic conductivity |
|---|---|---|---|---|---|---|
| | a | b | c | d | a + b | (S/cm) |
| Example 23 | 0.100 | 0.000 | 0.100 | 0.025 | 0.100 | 7.46 × 10⁻⁷ |
| Example 24 | 0.200 | 0.000 | 0.100 | 0.025 | 0.200 | 2.48 × 10⁻⁷ |
| Example 25 | 0.000 | 0.025 | 0.100 | 0.025 | 0.025 | 1.19 × 10⁻⁵ |
| Example 26 | 0.000 | 0.050 | 0.100 | 0.025 | 0.050 | 9.64 × 10⁻⁶ |
| Example 27 | 0.000 | 0.100 | 0.100 | 0.025 | 0.100 | 4.96 × 10⁻⁶ |
| Example 28 | 0.000 | 0.200 | 0.100 | 0.025 | 0.200 | 2.26 × 10⁻⁷ |
| Example 29 | 0.100 | 0.100 | 0.000 | 0.000 | 0.200 | 1.55 × 10⁻⁸ |

The note "*1" in the ionic conductivity column signifies that the ionic conductivity could not be measured due to high resistance.

TABLE 2

| | $Li_{6-3a-2b-c-d}Y_{1-c-d}Al_aMg_bZr_cCe_dB_3O_9$ | | | | | Peak position | Lattice volume |
|---|---|---|---|---|---|---|---|
| | a | b | c | d | a + b | 2θ(°) | (Å³) |
| Example 1 | 0.010 | 0.000 | 0.000 | 0.000 | 0.010 | 27.93 | 755.95 |
| Example 2 | 0.025 | 0.000 | 0.000 | 0.000 | 0.025 | 27.95 | 755.48 |
| Example 3 | 0.100 | 0.000 | 0.000 | 0.000 | 0.100 | 27.96 | 754.80 |
| Example 4 | 0.200 | 0.000 | 0.000 | 0.000 | 0.200 | 28.01 | 754.22 |
| Example 5 | 0.400 | 0.000 | 0.000 | 0.000 | 0.400 | 28.00 | 755.91 |
| Example 6 | 0.800 | 0.000 | 0.000 | 0.000 | 0.800 | *2 | — |
| Example 7 | 0.000 | 0.010 | 0.000 | 0.000 | 0.010 | 27.97 | 755.52 |
| Example 8 | 0.000 | 0.025 | 0.000 | 0.000 | 0.025 | 27.97 | 754.57 |
| Example 9 | 0.000 | 0.100 | 0.000 | 0.000 | 0.100 | 27.99 | 754.17 |
| Example 10 | 0.000 | 0.200 | 0.000 | 0.000 | 0.200 | 28.02 | 754.37 |
| Example 11 | 0.000 | 0.400 | 0.000 | 0.000 | 0.400 | 28.02 | 755.66 |
| Example 12 | 0.000 | 0.800 | 0.000 | 0.000 | 0.800 | *2 | — |
| Example 13 | 0.025 | 0.000 | 0.200 | 0.000 | 0.025 | 27.99 | 754.13 |
| Example 14 | 0.025 | 0.000 | 0.400 | 0.000 | 0.025 | 28.00 | 754.55 |
| Example 15 | 0.025 | 0.000 | 0.000 | 0.200 | 0.025 | 28.02 | 755.09 |
| Example 16 | 0.025 | 0.000 | 0.000 | 0.400 | 0.025 | 28.03 | 755.70 |
| Example 17 | 0.000 | 0.025 | 0.200 | 0.000 | 0.025 | 27.98 | 754.74 |
| Example 18 | 0.000 | 0.025 | 0.400 | 0.000 | 0.025 | 28.01 | 754.68 |
| Example 19 | 0.000 | 0.025 | 0.000 | 0.200 | 0.025 | 28.01 | 755.16 |
| Example 20 | 0.000 | 0.025 | 0.000 | 0.400 | 0.025 | 28.02 | 755.79 |
| Example 21 | 0.025 | 0.000 | 0.100 | 0.025 | 0.025 | 28.00 | 753.47 |
| Example 22 | 0.050 | 0.000 | 0.100 | 0.025 | 0.050 | 27.99 | 753.09 |
| Example 23 | 0.100 | 0.000 | 0.100 | 0.025 | 0.100 | 27.99 | 753.78 |
| Example 24 | 0.200 | 0.000 | 0.100 | 0.025 | 0.200 | 27.97 | 753.72 |
| Example 25 | 0.000 | 0.025 | 0.100 | 0.025 | 0.025 | 27.99 | 753.34 |
| Example 26 | 0.000 | 0.050 | 0.100 | 0.025 | 0.050 | 28.03 | 753.02 |
| Example 27 | 0.000 | 0.100 | 0.100 | 0.025 | 0.100 | 27.99 | 753.91 |
| Example 28 | 0.000 | 0.200 | 0.100 | 0.025 | 0.200 | 28.02 | 754.50 |
| Example 29 | 0.100 | 0.100 | 0.000 | 0.000 | 0.200 | 28.02 | 754.59 |

The note "*2" in the column of peak position signifies that no peak was observed within the range from 2θ=27.500 to 28.500. The hyphen "-" in the column of lattice volume signifies that no data was acquired.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ion-conductive solid comprising an oxide represented by Formula $Li_{6-3a-2b-c-d}Y_{1-c-d}Al_aMg_bZr_cCe_dB_3O_9$, wherein in the formula, a, b, c and d are real numbers satisfying $0.000 \leq a \leq 0.800$, $0.000 \leq b \leq 0.800$, $0.000 \leq c \leq 0.400$, $0.000 \leq d \leq 0.400$, and $0.005 \leq a+b \leq 0.800$.

2. The ion-conductive solid according to claim 1, wherein the c and the d are $0.000 \leq c \leq 0.200$ and $0.000 \leq d \leq 0.200$.

3. The ion-conductive solid according to claim 1, wherein the a is $0.000 \leq a \leq 0.400$.

4. The ion-conductive solid according to claim 1, wherein the b is $0.000 \leq b \leq 0.400$.

5. The ion-conductive solid according to claim 1, wherein the a+b is $0.010 \leq a+b \leq 0.800$.

6. The ion-conductive solid according to claim 1, wherein the a+b is $0.010 \leq a+b \leq 0.400$.

7. The ion-conductive solid according to claim 1, wherein the a, the b, the c and the d are $0.000 \leq c \leq 0.200$, $0.000 \leq d \leq 0.200$ and $0.010 \leq a+b \leq 0.100$.

8. An all-solid-state battery, comprising at least:

a positive electrode;

a negative electrode; and an electrolyte, wherein at least one selected from the group consisting of the positive electrode, the negative electrode and the electrolyte comprises the ion-conductive solid according to claim 1.

9. The all-solid-state battery according to claim 8, wherein at least the electrolyte comprises the ion-conductive solid.

\* \* \* \* \*